April 1, 1941.                    J. N. SELVIG                    2,236,583
                               MEASURING DEVICE
                            Filed March 13, 1940
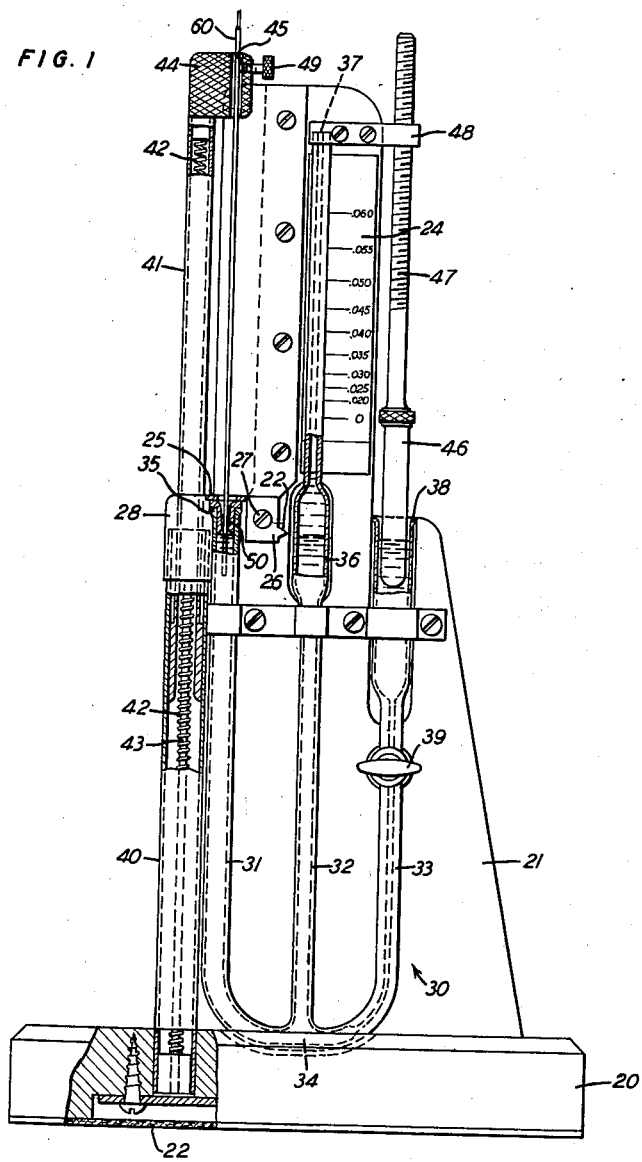
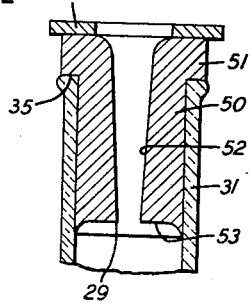
INVENTOR
J. N. SELVIG
BY
E. R. Nowlan
ATTORNEY Patented Apr. 1, 1941

2,236,583

UNITED STATES PATENT OFFICE 2,236,583

MEASURING DEVICE

John N. Selvig, Westfield, N. J., assignor to Western Electric Company, Incorporated, New York, N. Y., a corporation of New York Application March 13, 1940, Serial No. 323,708

9 Claims. (Cl. 33—174)

This invention relates to a measuring device and more particularly to a device for measuring directly the volume of a predetermined length of wire, slender rod or other elongated body, and thus to determine indirectly its average diameter or other related dimension.

There are many commercial and other products of relatively rigid, elongated and slender form, of which it is important to determine the average diameter, cross-sectional area, volume per unit length, and the like, in which for one reason or another, it is not feasible or convenient to measure one or the other of these quantities directly. In such cases the simplest mode of determining the quantity desired may be by direct measurement of the total volume of a predetermined length and conversion of this value into the one desired. Thus, for example, of recent years copper wire insulated with a substantially seamless sheath of paper pulp, felted and dried directly on the wire, has become of increasingly great importance in the manufacture of multi-strand electrical conductor cables for communications use, especially in telephony. The insulating sheath on such wire is, in effect, a tube of porous, blotter-like paper created directly on the wire from substantially ordinary paper stock, and dried in situ. This may be subjected also to some kind of polishing operation. The thickness of the sheath and its density will affect the electrical behavior of the insulated wire, and will have to be held to closely specified values, varying according to the precise service for which it is intended. The thickness of the sheath is obviously half the difference between the over-all diameter of the insulated wire and the diameter of the bare wire. The latter is easily determined by micrometer calipers. But to measure the diameter of the more or less fluffy, partly crushable and partly elastic paper pulp sheath, directly, is practically not possible; and if it were, would be illusory. For the diameter will vary measurably and importantly from point to point along or even around the strand, without causing the average value to vary widely. Any single direct measurement would be meaningless; and a great many would be required to yield a reliable average. In such an instance, therefore, volumetric measurement of a sample of set length from which over-all diameter can be directly read by a suitable scale solves the problem. However, in the particular instance noted, it is necessary to determine from sample lengths of the order of four to twelve inches, average over-all diameters of the order of 0.020 inch to 0.060 inch, or even more, with a probable error of the order of 0.0005 inch, plus or minus; while, at the same time, the device or apparatus employed must be simple to operate and adjust, if necessary, so that a technically skilled and trained operator is not required.

An object of the present invention is to provide a measuring device for making volumetric measurements of slender, relatively rigid, elongated articles, which device shall be simple, reliable, accurate and of improved sensitivity and range.

With the above and other objects in view, one embodiment of the invention may be presented in an immersion volume meter for wire comprising two uprising, intercommunicating, tubular arms containing a liquid such as mercury, and having a plug in one arm to rest on and prevent the rise of liquid in that arm and formed with a bore therethrough to permit of passing a wire to be immersed in the liquid.

Other objects and features of the invention will appear from the following detailed description of one embodiment thereof taken in connection with the accompanying drawing in which the same reference numerals are applied to identical parts in the several figures and in which:

Fig. 1 is a view in front elevation and partly in section of a device for determining the average over-all diameter of a length of wire or the like, constructed in accordance with the invention, and Fig. 2 is an enlarged detail view of a part thereof.

In the embodiment of the invention herein disclosed, a flat, slab-like base 20 of wood, molded plastic, metal or any suitable material has mounted and supported thereon a vertical support member 21 of sheet metal or other appropriate substance, and also may well have a soft pad or footing 22 of felt, rubber or the like on its under surface.

A fluid container unit, generally indicated at 30, has three parallel arms 31, 32 and 33, and is supported on the base 20 and held with its three arms vertical by the support 21. The three arms are tubular and preferably, though not necessarily, entirely of glass or other substantially transparent material, e. g. one or another of the recently discovered transparent or sufficiently translucent plastic compounds. The three arms are most conveniently in one general plane, although this is not essential; but, in any event, they are arranged to intercommunicate at their lower ends, or at least below the general working level of the apparatus, as indicated at 34.

One of the arms, 31 as here shown, is of substantially uniform and relatively wide cylindrical bore throughout, from its junction at 34 with the other arms to its upper open extremity at 35, which lies a short distance above the general working level of the apparatus which is indicated by a pointer 22 mounted on the support 21.

A second arm, here the arm 32, is also of substantially uniform and relatively wide cylindrical bore from the junction 34 to a point somewhat below the pointer 22, where it widens into an integral vertical and generally cylindrical bulb 36 extending to a point somewhat above the pointer 22, where it narrows again to have relatively narrow or even capillary bore of substantially uniform diameter up to its open extremity at 37. A graduated scale 24 is mounted on the support 21 beside the capillary portion of the arm 32.

The third arm, here 33, may be wide at the junction 34, but preferably is narrow or even capillary from a point near the junction to a point at some distance below the pointer 22, where it widens materially and extends on up as a vertically cylindrical reservoir, whose open top 38 lies somewhat above the pointer. A stop cock 39 is in the narrow part of the arm 33 at any convenient level below the reservoir 38.

A tubular guide casing 40 is mounted in the base 20 and supported by the member 21 to stand adjacent and parallel to the arm 31. A hollow slide 41 is vertically slidable in the casing 40 and guided and limited thereby to straight line motion only parallel to the axis of the main part of the arm 31. A helical compression spring 42 within the telescopically interfitted slide 41 and guide 40 maintains the slide normally yieldingly in its uppermost position as shown. Preferably an axial spring guide rod 43 is supported on the base 20 within the spring. A wire guide head 44 is mounted on the upper end of the slide 41 and is formed to have a laterally extended portion overhanging the upper end 35 of the arm 31, and provided with a vertical bore 45 coaxial with the bore of the arm 31.

A plunger 46, a little smaller in diameter than the inner diameter of the reservoir 38, is positioned partly within the reservoir and is supported by and adjustable up and down and thus more or less out of and into the reservoir with a threaded rod 47 supported in a correspondingly threaded fixed member 48 carried by the support 21.

A plug 50, of metal, molded plastic, or other suitable material, is positioned snugly in the upper end of the arm 31. A collar 51 extends over and rests on the circular top edge 35 of the arm to support the plug. An axial bore 52 extends through the plug, preferably tapering a little inwardly from top to bottom and flared at the top for easier insertion of a wire thereinto. The bottom of the plug is concavely countersunk as at 53, preferably so that the extreme bottom rim of the plug is substantially a knife edge resting against the wall of the arm 31. A hold-down member 25 supported on the member 21 serves to keep the plug 50 from moving up. As here shown the member 25 is an annular plate integral with the foot 26 of which the pointer 22 is also an integral part, the foot 22 being removably mounted on the support member by a screw 27. The central aperture of the member 25 is preferably larger than the upper end of the bore 52. The plug is so dimensioned that the bottom edge 29 of the bore 52 lies a trifle below the level of the pointer 22.

For use the unit 30 is filled with a suitable liquid, preferably mercury, up to the level of the pointer 22, and another suitable liquid, e. g. alcohol, toluene or water or the like, immiscible with the first liquid, is introduced into the bulb 36 of the arm 32 to fill the bulb above the first liquid and to extend up into the capillary portion of the arm to a point a little below the zero or initial mark of the scale 24.

Assuming now that the two liquids are mercury and water and that a pulp covered wire 60 is to be gauged, the mercury level is adjusted by opening the stop cock 39 and moving the plunger 46 up or down by rotating the rod 47, until the top of the mercury meniscus in the bulb 36 is at the level of the mark on the pointer 22; and the stop cock 39 is then closed. The top of the mercury column in the arm 31 is then held by the underface 53 of the plug 50 a trifle below the level of the free top of the mercury in the bulb 36, thus ensuring a constant and fixed level of mercury across the edge 29 of the bore 52, the bore being of too small diameter for the mercury to break its surface tension and rise into the bore under the forces brought into play. Thus this fixed interface between the mercury and the plug at the edge 29 provides an unvarying and immovable point of departure. In a particular apparatus made as herein disclosed the diameter of the aperture at 29 was 0.055 inch.

A suitable length of the pulp insulated wire to be gauged, say 8 to 10 inches, is rendered substantially straight and passed down through the bore 45, and its lower end inserted into the bore 52. It is then fed down carefully through the bores 45 and 52 until the water meniscus in the capillary of the arm 32 is at the zero or initial mark of the scale 24. The wire 60 is then clamped to the head 44. Ordinarily this may well be done with the fingers; but a jam screw 49 or other equivalent clamping means may be provided if desired.

The wire and the head 44 are then moved down together until the head is stopped by a stop member 28 mounted on the support 21. Thus a predetermined constant length of the wire to be gauged is forced down into the mercury in the arm 31 after the water meniscus was first brought to zero on the scale. In the particular case mentioned above the head 44 travels six inches to strike the stop 28; and thus six inches of the wire is used for the gauging.

The mercury displaced by the wire being forced into the arm 31 cannot escape upwardly in the arm 31 because of the plug 50 nor into the arm 33 because of the closed stop cock 39. All of the mercury displaced from the arm 31 therefore passes into the arm 32 to raise the mercury level in the bulb 36 and thus the water meniscus in the capillary beside the scale 24. The scale, as shown, is taken substantially from the particular apparatus already mentioned and is graduated to read the average over-all diameter of the six inch length of wire used. It might, however, equally well be graduated to read average cross-sectional area, total volume, or any other desired and similarly related metrical property.

It will be noted that, were the plug 50 not present and the top of the mercury column free in the arm 31, the movement of the mercury level in the bulb 36 would be only half as great, since the displaced mercury would cause the top of the column to rise in both of the arms 31 and 32.

It is found by experience that using the particular apparatus mentioned, wire of an over-all diameter from a maximum which will barely pass the aperture at 29 to a minimum known to be at most about one fifth the diameter of the aperture and probably below that, can be successfully and accurately gauged in the device and manner described, and that successive measurements of the same sample are strikingly concordant not only when made by the same observer but also when made by several different observers.

While the embodiment of the invention disclosed as an illustration, presents three intercommunicating arms in the unit 30, it will be clear that the arm 33 is not basically essential, but may be omitted. Also, while the arms 31, 32 and 33 are shown and described as vertical and parallel, it is not necessary that they be either vertical or parallel. It is only necessary that they rise from the junction 34. Hence, the word "uprising" is used in the appended claims to mean that an arm or arms have their respective ends, as 35, 37 and 38, above their intercommunication, as 34. Other modifications of and departures from the disclosure may also be made without departing from the spirit and scope of the invention as set forth in and limited only by the appended claims.

What is claimed is:

1. A device for directly measuring the total volume of a slender, relatively rigid and elongated object, which device comprises a member formed with an uprising immersion chamber and with an uprising reporting chamber communicating with the immersion chamber, a body of liquid in both chambers and continuous through the communication therebetween, and means in the immersion chamber in contact with and to prevent the rise of the liquid in the immersion chamber, the means being formed to admit an object to be measured into the liquid in the immersion chamber.

2. A device for directly measuring the total volume of a slender, relatively rigid and elongated object, which device comprises a member formed with an uprising immersion chamber and with an uprising reporting chamber communicating with the immersion chamber, a body of liquid in both chambers and continuous through the communication therebetween, and means in the immersion chamber in contact with and to prevent the rise of the liquid in the immersion chamber, the means being formed to admit an object to be measured into the liquid in the immersion chamber in combination with means to measure the rise of liquid in the reporting chamber occasioned by entrance of the object into the immersion chamber.

3. A device for directly measuring the total volume of a slender, relatively rigid and elongated object, which device comprises a pair of uprising tubular members intercommunicating at their lower portions, a body of liquid in the members and continuous through their intercommunication, and a plug fixed in position in one of the members in contact with the top of the column of liquid therein to prevent upward movement of liquid therein, the plug being formed with a bore therethrough to admit an object to be measured into the liquid adjacent to the plug.

4. A device for directly measuring the total volume of a slender, relatively rigid and elongated object, which device comprises a pair of uprising tubular members intercommunicating at their lower portions, a body of liquid in the members and continuous through their intercommunication, and a plug fixed in position in one of the members in contact with the top of the column of liquid therein to prevent upward movement of liquid therein, the plug being formed with a bore therethrough to admit an object to be measured into the liquid adjacent to the plug in combination with means to measure the rise of liquid in the other of said tubular members occasioned by the entrance of the object through the plug into the body of liquid.

5. A device for directly measuring the total volume of a slender, relatively rigid and elongated object, which device comprises a pair of uprising glass tubes intercommunicating at their lower portions, a body of mercury in the tubes and continuous through their intercommunication, and a plug fixed in position in one of the tubes with its bottom face in contact with the top of the column of mercury therein to prevent upward movement of the mercury therein, the plug being formed with an axial bore therethrough to admit an object to be measured into the mercury adjacent to the plug.

6. A device for directly measuring the total volume of a slender, relatively rigid and elongated object, which device comprises a pair of uprising glass tubes intercommunicating at their lower portions, a body of mercury in the tubes and continuous through their intercommunication, and a plug fixed in position in one of the tubes with its bottom face in contact with the top of the column of mercury therein to prevent upward movement of the mercury therein, the plug being formed with an axial bore therethrough to admit an object to be measured into the mercury adjacent to the plug and the plug being further formed at the under side thereof with a concave terminal surface.

7. A device for directly measuring the total volume of a slender, relatively rigid and elongated object, which device comprises a pair of uprising glass tubes intercommunicating at their lower portions, a body of mercury in the tubes and continuous through their intercommunication, and a plug fixed in position in one of the tubes with its bottom face in contact with the top of the column of mercury therein to prevent upward movement of the mercury therein, the plug being formed with an axial bore therethrough to admit an object to be measured into the mercury adjacent to the plug in combination with a scale associated with the second tube to show and measure the movement of mercury therein occasioned by the entrance of an object through the plug into the body of mercury.

8. A device for directly measuring the total volume of a slender, relatively rigid and elongated object, which device comprises a pair of uprising tubular members intercommunicating at their lower portions, a body of liquid in the members and continuous through their intercommunication, and a plug fixed in position in one of the members in contact with the top of the column of liquid therein to prevent upward movement of liquid therein, the plug being formed with a bore therethrough to admit an object to be measured into the liquid adjacent to the plug in combination with a third uprising tubular member intercommunicating with the first specified tubular member and containing a portion of the body of liquid, and means in the third tubular member to adjust the normal level of the body of liquid to maintain the same in contact with the plug.

9. A device for directly measuring the total volume of a slender, relatively rigid and elongated object, which device comprises a pair of uprising glass tubes intercommunicating at their lower portions, a body of mercury in the tubes and continuous through their intercommunication, and a plug fixed in position in one of the tubes with its bottom face in contact with the top of the column of mercury therein to prevent upward movement of the mercury therein, the plug being formed with an axial bore therethrough to admit an object to be measured into the mercury adjacent to the plug in combination with a third uprising tube intercommunicating with the first specified tube and containing a portion of the body of mercury, and a plunger in the third tube adjustable to adjust the normal level of the body of mercury to maintain the same in contact with the plug.

JOHN N. SELVIG.